(12) United States Patent
McCarty et al.

(10) Patent No.: US 12,554,143 B2
(45) Date of Patent: Feb. 17, 2026

(54) OPTICAL AND PHOTONIC CONFIGURATIONS AND DEVICES FOR SELECTIVE PRIVACY PROTECTION

(71) Applicant: Accenture Global Solutions Limited, Dublin (IE)

(72) Inventors: Benjamin Glen McCarty, Washington, DC (US); Johannes Jacobus Louw Basson, Arlington, VA (US)

(73) Assignee: Accenture Global Solutions Limited, Dublin (IE)

( * ) Notice: Subject to any disclaimer, the term of this patent is extended or adjusted under 35 U.S.C. 154(b) by 499 days.

(21) Appl. No.: 18/315,242

(22) Filed: May 10, 2023

(65) Prior Publication Data

US 2024/0377650 A1    Nov. 14, 2024

(51) Int. Cl.
    *G02B 27/28*    (2006.01)
(52) U.S. Cl.
    CPC .................................. *G02B 27/286* (2013.01)
(58) Field of Classification Search
    CPC ..................................................... G02B 27/286
    USPC ..................................................... 359/490.02
    See application file for complete search history.

(56) References Cited

U.S. PATENT DOCUMENTS

| | | | | |
|---|---|---|---|---|
| 2,169,688 A * | 8/1939 | Frotschner | ............. | G03B 13/20 |
| | | | | 359/488.01 |
| 2,199,715 A * | 5/1940 | Sauer | .................. | G02B 27/281 |
| | | | | 359/490.02 |
| 2,825,271 A * | 3/1958 | Mckae | ..................... | G03B 7/04 |
| | | | | 359/488.01 |
| 3,183,763 A * | 5/1965 | Koester | ................. | G01N 21/21 |
| | | | | 359/490.02 |
| 3,936,147 A * | 2/1976 | Murakami | ........... | G02B 27/288 |
| | | | | 359/490.02 |
| 4,151,411 A * | 4/1979 | Derderian | ............ | G02B 27/281 |
| | | | | 359/490.02 |
| 4,202,601 A * | 5/1980 | Burbo | ..................... | G02C 7/12 |
| | | | | 359/490.02 |
| 7,170,679 B2 * | 1/2007 | Bievenour | ............... | G02B 5/24 |
| | | | | 359/489.08 |
| 2005/0129918 A1 * | 6/2005 | Mac Master | ........ | G02B 5/3083 |
| | | | | 348/E5.136 |

(Continued)

*Primary Examiner* — Ricky D Shafer
(74) *Attorney, Agent, or Firm* — Seed Intellectual Property Law Group LLP

(57) ABSTRACT

The disclosure below is directed to optical/photonic devices and systems configured to control polarization state of light for selective privacy protection in optical imaging. In particular, the various embodiments disclosed below provide an application of polarization manipulation techniques with multiple optical polarization filters to enable partial or full privacy while maintaining functioning of image-based spatial mapping and localization algorithms used in video devices such as virtual reality (VR), augmented reality (AR), and robot/drone cameras. In the disclosed example approaches, the various polarization filters are configured to allow no or negligibly small amount of light from the privacy protected regions of a scene into the cameras in a privacy mode and to reject 100% of all light and enable full privacy in a block mode. The disclosed approaches also dynamically account for orientation changes during operation of the camera devices such that privacy is dynamically protected in real-time.

20 Claims, 8 Drawing Sheets

(56) References Cited

U.S. PATENT DOCUMENTS

| | | | |
|---|---|---|---|
| 2006/0146405 A1* | 7/2006 | Macmaster | H04N 5/72 |
| | | | 348/E5.136 |
| 2015/0029389 A1* | 1/2015 | Masanori | G02F 1/13725 |
| | | | 348/373 |
| 2021/0302636 A1* | 9/2021 | Oh | G02B 5/3058 |
| 2023/0185125 A1* | 6/2023 | Ruan | G02F 1/13475 |
| | | | 349/96 |

* cited by examiner

OPTICAL AND PHOTONIC CONFIGURATIONS AND DEVICES FOR SELECTIVE PRIVACY PROTECTION

BACKGROUND

Technical Field

This application relates to optical/photonic devices and systems configured to control polarization state of light for selective privacy protection in optical/photonic imaging.

Background Technologies

Cameras are essential components of modern communication networks. Networked cameras may be subject to unauthorized access and control by remote threat actors or by malicious local software for purposes of invading privacy of the camera user/owner. Networked cameras may thus be adversely controlled to record videos/images and transmit the recorded videos/images even when they are believed to be off or disabled and offline.

BRIEF SUMMARY

The disclosure below is directed to optical/photonic devices and systems configured to control polarization state of light for selective privacy protection in optical/photonic imaging. In particular, the various embodiments disclosed below provide an application of polarization manipulation techniques with multiple optical polarization filters to enable partial or full privacy while maintaining functioning of image-based spatial mapping and localization algorithms used in video devices such as virtual reality (VR), augmented reality (AR), and robot/drone cameras. In the disclosed example approaches, the various polarization filters are configured to allow no or negligibly small amount of light from the privacy-protected regions of a scene into the cameras in a privacy mode and to reject 100% of all light and enable full privacy in a block mode. The disclosed approaches also dynamically account for orientation changes during operation of the camera devices such that privacy is dynamically protected in real-time.

In an example implementation, an optical/photonic device is described. The optical/photonic device may include a polarization assembly comprising a stack of multiple planar polarizer plates with an optical/photonic aperture; a mounting mechanism adapted for coupling the polarization assembly to a camera to cover an input aperture of the camera, the camera being operative in a predefined reference frame; and a polarization control mechanism for separate adjustment of at least two of the multiple planar polarizer plates between at least a privacy-protection mode and a normal mode of the polarization assembly. The polarization assembly, when being adjust to the privacy-protection mode, is configured to reject input light in a predefined polarization state with respect to the predefined reference frame from entering the optical aperture of the camera, and to allow for entry into the optical aperture of the camera at least an attenuated portion of the input light in an unpolarized state with respect to the predefined reference frame. The polarization assembly, when being adjusted to the normal mode, is configured to allow for entry into the optical aperture of the camera at least an attenuated portion of the input light having either the predefined polarization state or the unpolarized state with respect to the predefined reference frame.

DETAILED DESCRIPTION

Figure 1:
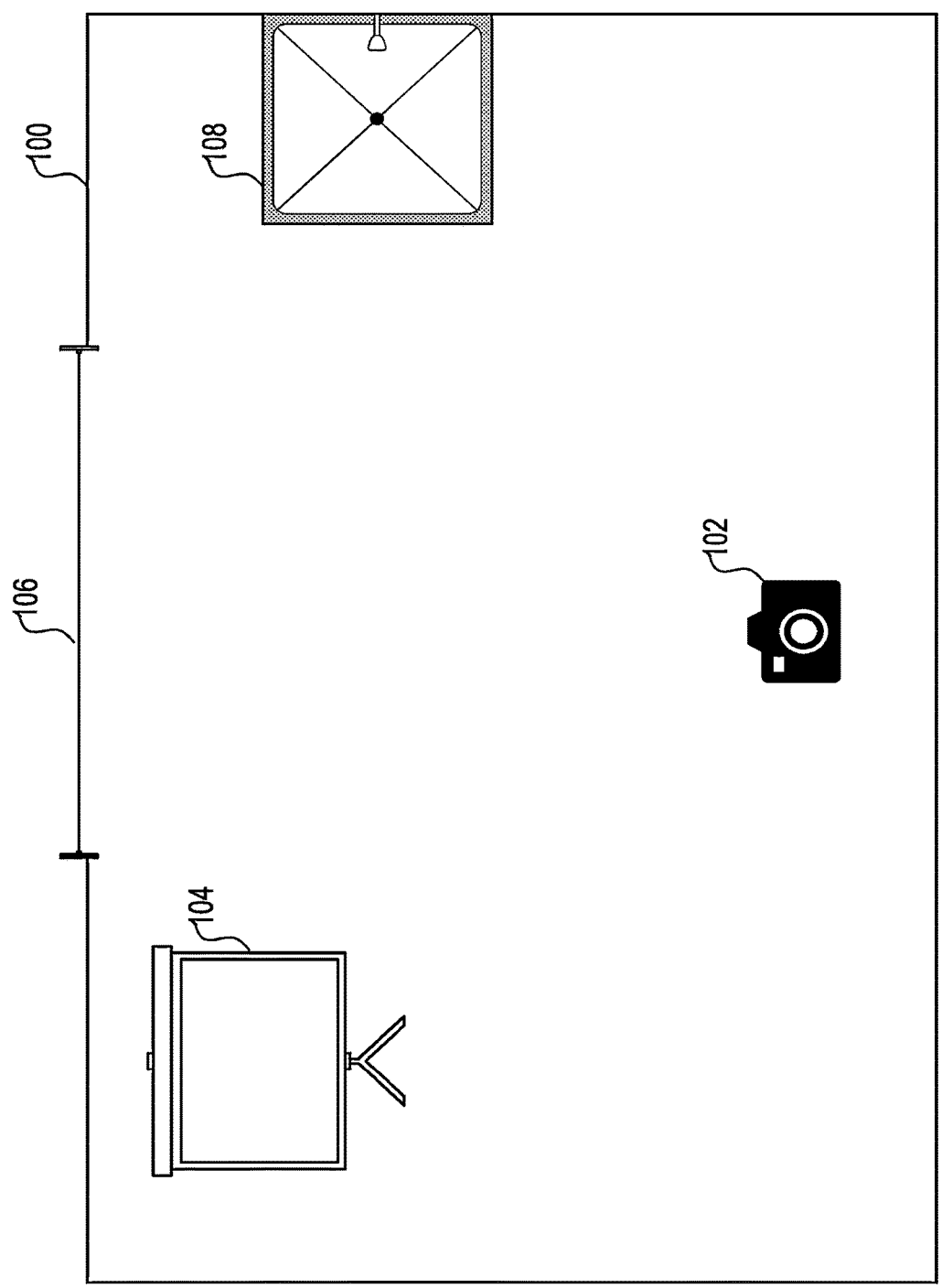
FIG. 1 illustrates an example application scenario for the optical/photonic device and system embodiments of the current disclosure.

The optical/photonic devices and systems will now be described in detail hereinafter with reference to the accompanied drawings, which form a part of the present disclosure, and which show, by way of illustration, various example implementations and embodiments. The optical/photonic devices and systems may, however, be embodied in a variety of different forms and, therefore, the disclosure herein is intended to be construed as not being limited to the embodiments set forth. Further, the disclosure may be embodied as methods, components, and/or platforms in addition to the disclosed devices and systems. Accordingly, embodiments of the disclosure may, for example, take the form of hardware, software, firmware or any combination thereof.

In general, terminology may be understood at least in part from usage in its context. For example, terms, such as "and", "or", or "and/or," as used herein may include a variety of meanings that may depend at least in part upon the context in which such terms are used. Typically, the term "or", if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for the existence of additional factors not necessarily expressly described, again, depending at least in part on context.

By way of introduction, online cameras are essential components of modern communication networks, particularly in communications involving interactive contents. The term camera, as used in this disclosure, broadly refers to any image or video recording devices in any spectral range (e.g., visible optical range, or infrared spectral range, and the like) or any other spatially resolved optical or photonic detectors.

Networked cameras may be used in various specific applications. For example, some distributed cameras may be used to feed live content to remote locations, such as in applications involving video conferencing, security monitoring, augmented reality, and other immersive/interactive applications. For another example, contents generated by cameras having limited processing capabilities may need to be transmitted to and processed by remote servers in order to generate particular outputs in the form of, for example, control signals. For these and various other types of applications, local cameras are routinely connected to communication networks at any geographical level, and powered by various underlying wireline and wireless communication technologies.

Like many other electronic devices that are connected to the communication networks, networked cameras are subject to maliciously access by network hackers. In other words, networked cameras may be subject to unauthorized access and adverse control by remote threat actors or by malicious local software deployed by remote threat actors to record videos/images and transmitted the recorded videos/images to remote destinations even when the networked cameras are believed to be on standby, disabled, offline, or powered off. Such unauthorized access and control may be motivated by various malicious purposes/motivations including but not limited to invasion and exploitation of private information not intended for the public.

In some application, such unauthorized recording and transmission of images/videos of private scene from networked cameras may be defeasible by placing opaque covers over the optical apertures of the cameras when the cameras are not in use. However, such a solution would be ineffective when the cameras need to record and that the opaque covers must be removed. In addition, there are situations/applications where the network cameras need to be constantly recording and thus no opaque covers should be in place at all.

Specifically, a wide range of applications, including but not limited to virtual reality, augmented reality, extended reality, robotic navigation, autonomous driving, may require outward facing cameras for spatial tracking and mapping via Simultaneous Localization and Mapping (SLAM) based on real-time computer vision and image analysis. These cameras cannot be covered as they need to constantly record its environment so as to collect sufficient real-time surrounding information for timely performance of SLAM.

In the various example implementations described in the disclosure below, optical/photonic devices and schemes are designed to enable networked cameras to record its surroundings and to operate normally for SLAM and other purposes while providing protection of privacy regions in the surroundings from being recorded with usable imaging information.

An example indoor application environment for the various example implementations further described below is illustrated as 100 in FIG. 1. The example indoor application environment 100 may include a networked camera 102 (herein referred as a camera for simplicity). The camera 102 may be stationary. For example, the camera 102 may be affixed or integral to another stationary electronic device. For another examples, the camera may be attached to a fixture of the environment 100 and function as, for example, a security camera or for other monitoring purposes. Alternatively, the camera 102 may be mobile. For example, the camera 102 may be part of a robot vacuum machine, a drone, or any other mobile device being used or operated in the environment 100. Either being fixed or mobile, the camera 102 may be controlled to adjust its orientation. For example, the camera 102 may be rotated to face any direction. In addition, imaging optics of the camera 102 may be controlled to zoom to various fields of view. The camera 102 may be connected to the communication networks via wireline or wireless links. The wireless links, for example, may be provided via communication modules for implementing infrared, WiFi, WiMax and various generation of cellular communication technologies, and the like. The camera 102 may be in extended operation and connected to the networks while subject to malicious authorized access from remote network locations or by local malwares.

The example indoor application environment 100 further includes privacy regions 104, 106 and 108. These privacy regions may include any subfields of view by the camera 102 in the environment 10 which the user of the camera 102 desires to prevent from being captured in case that the camera 102 is unknowingly accessed by unauthorized remote hackers. These privacy regions may be defined by spatial extensions of privacy objects in the environment 100. For example, the privacy region 104 may represent a display screen and a subfield of view extended by the display screen with respect to the camera 102. The display screen 104 may be designated as private because it may often display private or confidential contents not suitable for public view. For another example, the privacy region 108 may represent personal space in the environment 100, such as a private shower space. For yet another example, the privacy region 106 may represent outfacing window area 106 of the environment 100. One reason that the user may designate the window area 106 as a privacy region may be that images taking by the camera 102 showing outside skyline or star constellation through the window area 106 may inadvertently contain information that could reveal geographical location of the environment 100. Other areas or regions in the environment 100 may be designated by the user as non-privacy regions because they do not contain sensitive information and even if the images/videos thereof falls into wrong hands (unauthorized remote hackers), they would not be effectively exploitable. Image contents of these regions alone as taken by the camera 102 without information from the privacy regions, on the other hand, may be sufficient for the purpose of, for example, various SLAM functions.

In the various example implementations below, optical/photonic devices and schemes are designed and arranged such that the environment 100 for the camera 102 is divided into privacy regions and non-privacy regions, that the privacy regions are prevented from being imaged by the camera 102 or are at best imaged with insufficient exposure such that the corresponding portions of the images as recorded by the camera 102 are of little use to an unauthorized hacker, whereas the non-privacy areas are imaged with adequate exposure, yielding portions of the images that can be relied on for SLAM functions but are incapable of revealing any private information to the unauthorized hackers.

Figure 2:
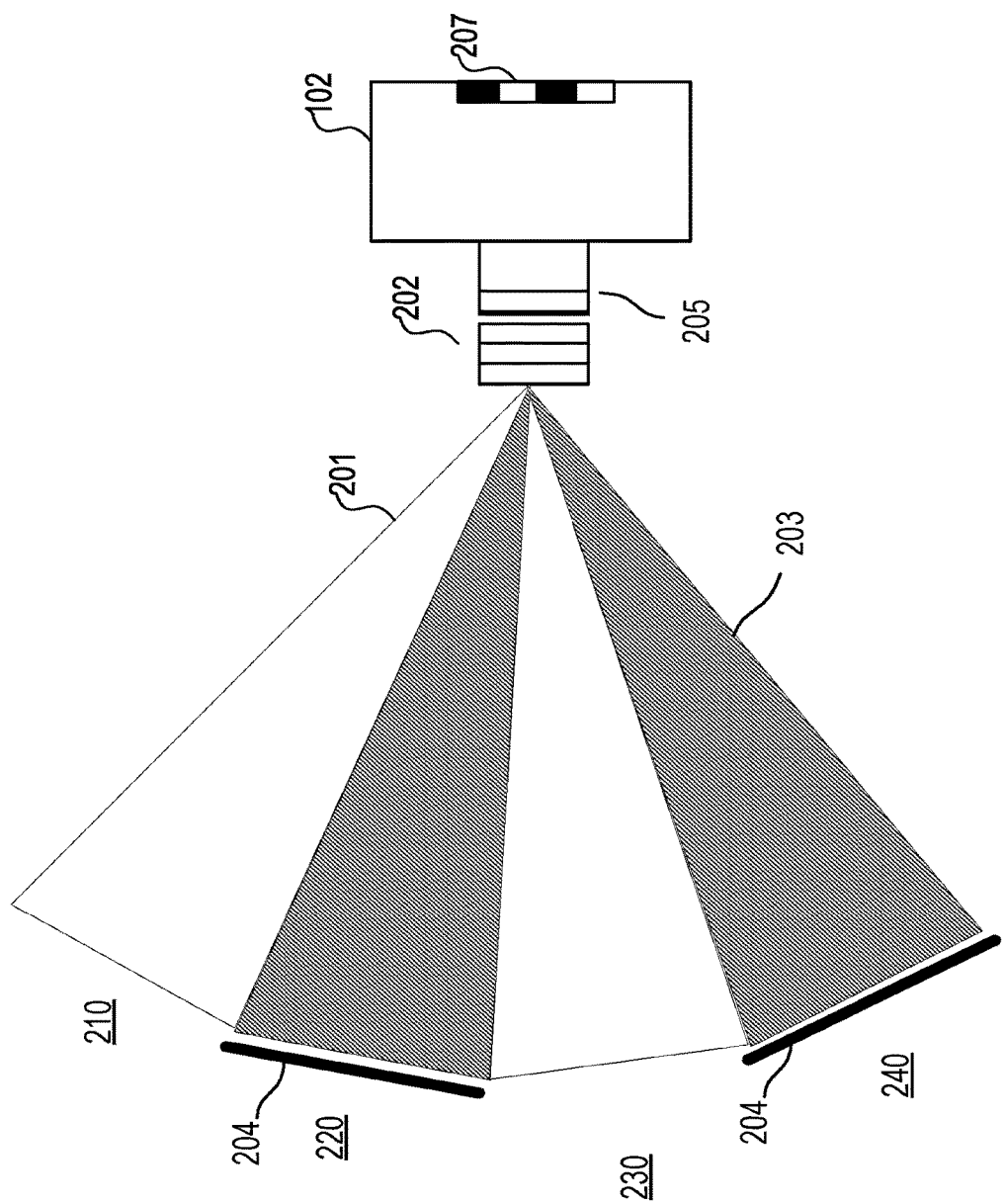
FIG. 2 illustrates a general configuration for applying the various optical/photonic device and system embodiments of the current disclosure to a general application scenario.

A general illustration of an example optical/photonic scheme and arrangement is shown in FIG. 2. FIG. 2 shows the camera 102 with its field of view between 201 and 203. Because the camera 102 may be controlled to rotate and zoom in various manners with respect to a reference frame fixed with respect to the environment, the field of view shown in FIG. 2 may change in the environmental reference frame as the camera rotates and/or moves, and/or zoom.

FIG. 2 shows that, with respect to the field of view of the camera 102, example regions 220 and 240 may be designated as privacy regions, whereas the remaining regions 210 and 230 may be designated as non-privacy regions. FIG. 2 shows that an optical/photonic device 202 in combination with another optical/photonic component 204 for each of the privacy regions 220 and 240 may be configured such that the privacy regions 220 and 240 cannot be effectively imaged by the camera 102 due to insufficient light exposure whereas the non-privacy regions 210 and 230 are sufficiently images by the camera 102. The portions of the images taken by the camera 102 as being associated with the non-privacy regions 210 and 230 may contain sufficient information for the camera 102 and image processing circuitry associated with the camera 102 to perform the SLAM or other desired functions.

In some examples, the optical/photonic scheme described above with respect to FIG. 2 may be achieved using polarization optics as optical filters. In other words, the optical/photonic device 202 and the optical/photonic components 204 may include various combinations of optical polarizers as described in further detail in the various examples below. As a general underlying principle for the various example implementations below, the purpose of the optical/photonic components 204 is to convert/filter light from the private regions (or objects) into a predefined polarization state. Such light of the predefined polarization state, when impinging towards an optical aperture 205 of the camera 102 for subsequent processing by the lens assembly of the camera 102 for imaging would need to first pass through the optical/photonic device 202 disposed to cover the optical aperture of the camera 102. The optical/photonic device 202 may be configured to include optical polarization components which, in combination with the optical/photonic component 204, would operate in at least a privacy mode in which all or a large percentage of light from the privacy regions for imaging is rejected prior to entering the optical aperture 205 of the camera 102 such that the exposure of light from the privacy regions 220 and 240 in the camera 102 is insufficient for recording useful image information at an image sensor 207 of the camera 102 (e.g., a pixelated CCD sensor, a CMOS image sensor, a photonic detector, a photonic detector array, or the like).

Figure 3:
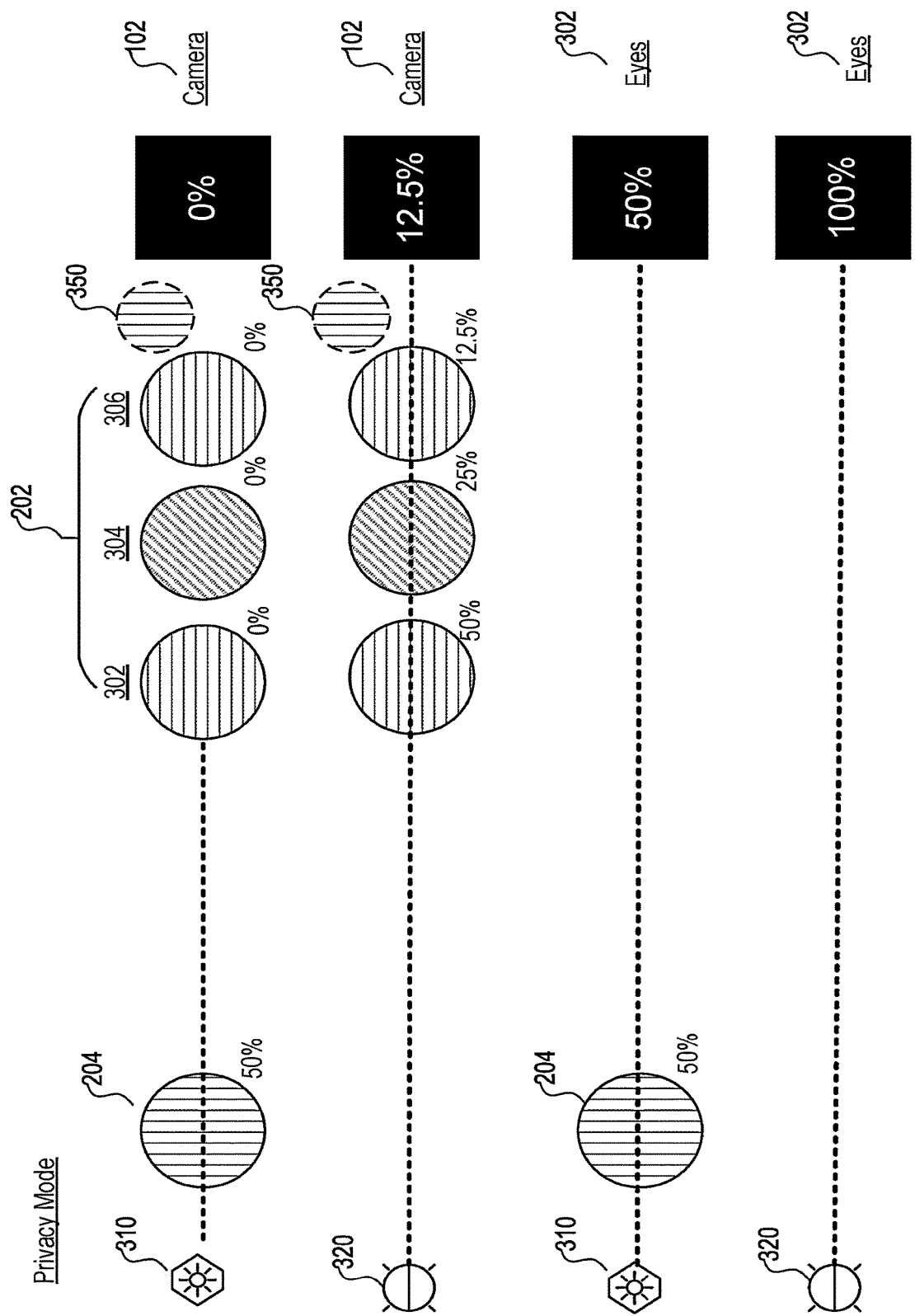
FIG. 3 illustrates an example configuration for a privacy mode of an example optical/photonic device and system embodiment of the current disclosure.
Figure 4:
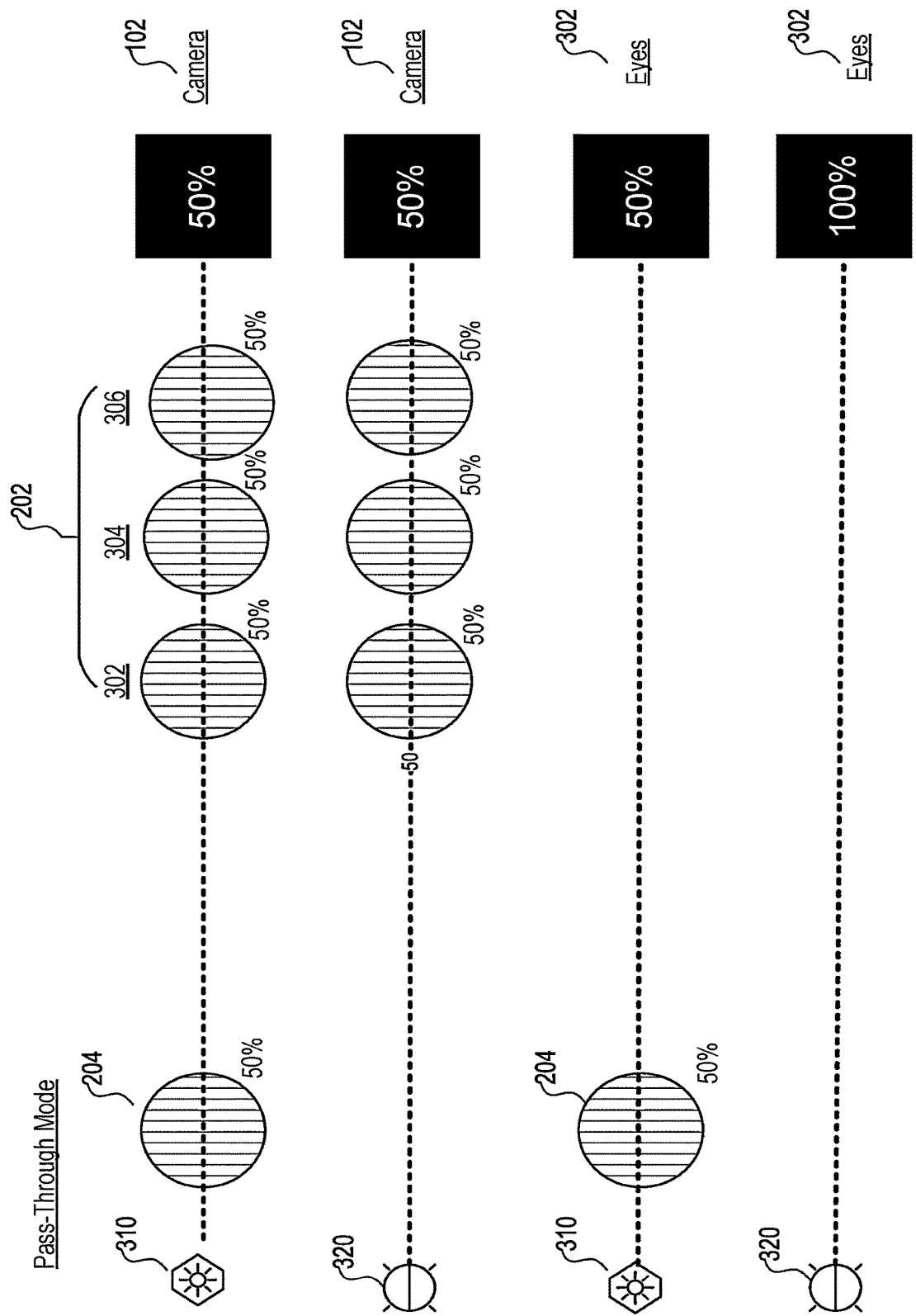
FIG. 4 illustrates an example configuration for a normal pass-through mode of an example optical/photonic device and system embodiment of the current disclosure.
Figure 5:
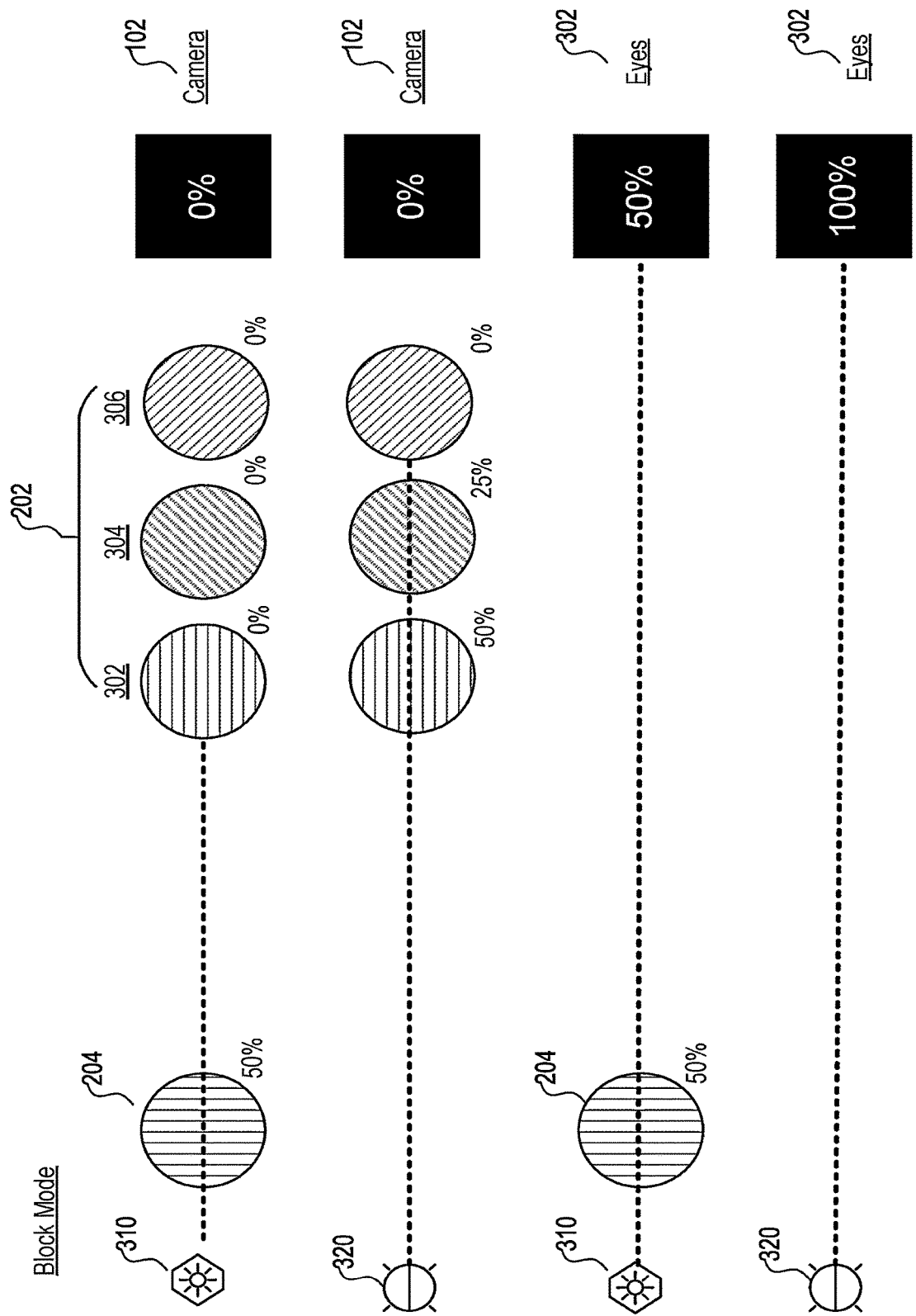
FIG. 5 illustrates an example configuration for a block mode of an example optical/photonic device and system embodiment of the current disclosure.

In some example implementations, the optical/photonic component 204 and the optical/photonic device 202 may include multiple linear polarizers. These linear polarizers may be arranged to provide several different operation modes, as shown in the examples of FIGS. 3-5. For example, FIG. 3 shows an optical/photonic arrangement of the optical/photonic component 204 and optical/photonic device 202 for achieving a privacy mode, where the privacy regions of the surroundings are not effectively imaged by the camera whereas the non-privacy regions are adequately imaged for, e.g., SLAM purposes. FIG. 4 shows an example optical/photonic arrangement of the optical/photonic component 204 and optical/photonic device 202 for achieving a pass-through mode, where both the privacy regions and the non-privacy regions of the surroundings are sufficiently imaged. FIG. 5 shows an optical/photonic arrangement of the optical/photonic component 204 and optical/photonic device 202 for achieving a block mode, where none of the privacy regions and the non-privacy regions of the surroundings is sufficiently imaged. The user of the camera may designate the various privacy regions with the optical/photonic component 204 and adjust the optical/photonic device 202 to place it in any one of the privacy mode, pass-through mode, and block-mode of operation, either via manual or automatic mechanical or electronic setting mechanism(s). In the samples of FIGS. 3-5, the optical/photonic device 202 may include a stack of three planar linear polarizers. Polarization axes of at least two of the three planar linear polarizers are configured to be adjustable in order to place the optical/photonic device 202 in one of the three example operational modes. Further in the examples of FIGS. 3-5, the optical/photonic component 204 may include a single linear polarization filter.

FIG. 3 shows an optical/photonic arrangement of the optical/photonic component 204 and optical/photonic device 202 for achieving the privacy mode of operation. In the privacy mode of FIG. 3, each optical/photonic component 204 is configured as a linear polarizer applied to each of the privacy regions of the environment. The polarization axis of each of the optical/photonic component 204 is configured in a predefined orientation corresponding to a predetermined optical polarization state. In the example of FIG. 3, the predefined optical polarization state may be a linear polarization in the vertical direction relative to the predefined environmental reference frame. The optical/photonic component 204 is correspondingly arranged such that its linear polarization axis (shown by the lines within the optical/photonic component 204) is aligned in the vertical direction. Such optical/photonic component 204 may be implemented as a standalone planar optical filter placed in between the privacy object and the camera 102 so as to effectively creating a polarized privacy region. Alternatively, the optical/photonic component 204 may be implemented as a polarizing film applied to the privacy object, thereby creating the privacy region. For example, a shower curtain for the shower space 108 of FIG. 1 may be implemented as a polarizing curtain in order to render the shower space private. For another example, a linear polarizer may be applied to the display screen 104 of FIG. 1 in order to create a privacy region. In general, a transmissive polarization filter placed anywhere in the filed view of the camera would create an privacy region behind the polarization filter.

As shown in FIG. 3, light from the privacy region to the camera may be referred to as private light 310. Private light 310 may be generated and emitted by a private object (such as a backlighting source within an LCD display screen). Such private light may need to pass through the optical/photonic component 204 prior to reaching inside the camera 102. Alternatively, private light 310 may originate from outside ambient light such as from objects outside of the window areas 106 of FIG. 1. Such private light, too, may need to pass through the optical/photonic component 204 prior to reaching the inside of the camera 102. For some other privacy regions, private light 310 from a privacy object may originate from ambient light in the environment, but, after being scattered, reflected, refracted, diffracted, or deflected by the private object, may need to pass through the optical/photonic component 204 placed between the privacy object and the camera prior to reaching the inside of the camera 102. For yet some other situations where the optical/photonic component 204 is applied as an optical/photonic film over a private object, the corresponding private light may be generated by ambient light being scattered, deflected, reflected, detracted, or refracted by the applied optical/photonic film.

In any of these situations, the private light as shown by 310 in FIG. 3 may become polarized in the predefined polarization state before reaching the inside of the camera 102. Assuming that the origin of the private light is unpolarized, and assuming that other losses from the optical/photonic component 204 can be negligible, the amount of linearly polarized light reaching inside the camera 102 may be 50% of the amount of unpolarized light without the optical/photonic component 204, as shown in the top branch of FIG. 3.

As further shown in FIG. 3, the optical/photonic device 202 may include three stacked planar linear polarizers. The three planar linear polarizers may be referred to as a first, second, and third planar linear polarizers in order of reverse proximity to (or facing) the camera 102, labeled as polarizer plates 302, 304, and 306, respectively. In the example privacy mode of FIG. 3, the first planar linear polarizer 203 may be configured with a polarization axis that is orthogonal to the predefined polarization of the private light (e.g., in a horizontal direction when the predefined polarization arrangement of the optical/photonic component 204 if vertical). With such an optical/photonic arrangement, the vertically polarized private light from the privacy regions would be blocked by the first planar linear polarizer 302 and thus cannot enter the inside of the camera 102. Thus, the image sensor of the camera 102 would record dark patches of pixels corresponding to the privacy regions.

The second and the third planar linear polarizers 304 and 306 may be further arranged such that unpolarized non-private light 320 (light emitted/scattered/deflected/reflected/refracted from non-privacy regions) would at least partially pass through the optical/photonic device 202 to reach the inside of the camera 102 for sufficient exposure at the image sensor of the camera 102 to form image portions corresponding to the non-privacy regions, as shown in the second branch of FIG. 3.

In the example implementation of FIG. 3, the second planar linear polarizer 304 may be configured with a polarization axis at 45 degrees relative to that of the first planar linear polarizer 302. As such, the non-private light 320 of FIG. 4 would be further reduced by 50% in intensity on top of the 50% intensity reduction by the first planar linear polarizer 302, rendering 25% light intensity for the non-private light after passing through and being filtered by the first planar linear polarizer 302 and the second planar linear polarizer 304.

Further in the example implementation of FIG. 3, polarization axis of the third planar linear polarizer 306 may be configured at 45 degrees off that of the second planar linear polarizer 304, e.g., it may be arranged in a horizontal direction. As such, the amount of non-private light would be further reduced by 50%, rendering a total of 12.5% of the original non-private light impinging into the inside of the camera 102. In most applications, 12.5% of original light can be sufficient for forming clear images of the non-privacy regions for purposes such as SLAM analysis. Alternatively, in FIG. 3, the polarization axis of the third planar linear polarizer 306 may be configured in the horizontal direction rather than the vertical direction, as shown by 350 (which would also be 45 degrees from that of the second planar linear polarizer 304), for achieving a same 12.5% throughput of the non-private light.

As further shown in the third branch of FIG. 3, for a human observer, the effect of the optical/photonic component 204 is a mere 50% reduction in perceived light intensity, which is usually of little significance as human eyes perceive light intensity on a logarithmic rather than linear scale. The fourth and final branch of FIG. 3 shows that there would be no effect from the example optical/photonic scheme as to non-private object perceived by a human observer.

FIG. 4 shows an example optical/photonic arrangement of the optical/photonic component 204 and optical/photonic device 202 for achieving an example pass-through mode, where both the privacy regions and the non-privacy regions of the surroundings are sufficient imaged. As shown in the example of FIG. 4, all polarization components, including the optical/photonic component 204, the first planar linear polarizer 302, the second planar linear polarizer 304, and the third planar linear polarizer 306 are configured to align their polarization axes, e.g., in the vertical direction (or any other polarization directions). As such, the private light from privacy regions of the environment would only be reduced by 50% at the camera sensor, as shown by the first branch of FIG. 4. Similarly, light from non-privacy regions would also be reduced by 50% at the camera sensor, as shown by the second branch from the top in FIG. 4. As such, both the privacy regions and the non-privacy regions would be similarly recorded by the camera without differentiation, as desired when the system is placed in the pass-through mode. The third and fourth branches of FIG. 4 show that, for a human observer, the privacy objects would be 50% dimmer whereas the non-privacy objects would retain its full intensity. Again, the 50% reduction of privacy objects is usually unnoticeable as human vision perception is non-linear as a function of light intensity (logarithmic rather than linear).

FIG. 5 shows an optical/photonic arrangement of the optical/photonic component 204 and optical/photonic device 202 for achieving an example block mode, where none of the privacy regions and the non-privacy regions of the surroundings is sufficient imaged. As shown in the top branch of the example arrangement of FIG. 5, the blocking of private light 310 in the privacy regions from the camera sensor may be achieved in two folds. First, the blocking may be achieved by orienting the polarization axis of the first planar linear polarizer 302 in an orthogonal direction to that of the predefined polarization for privacy regions (as determined by the polarization orientation of the optical/photonic component 204). Second the blocking may be further achieved by arranging the polarization axes of the second planar linear polarizer 304 and the third planar linear polarizer 306 in an orthogonal manner. As a result of the above optical/photonic scheme in the block node operation, no private light could reach the camera sensor. The privacy regions are thus fully blocked.

As shown in the second branch of FIG. 5, non-private light from the non-privacy regions are also blocked from reaching the camera sensor in the block mode. In the example optical/photonic scheme of FIG. 5, the blocking of non-private light is achieved as a result of the polarization orthogonality between the second planar linear polarizer 304 and the third planar linear polarizer 306. The block mode of FIG. 5 is designed to be applicable to the camera 102 only. As shown in the third and fourth branches of FIG. 5, the effect of the above optical/photonic scheme is nearly unnoticeable for a human observer, as the only effect is that the private object would appear 50% dimmer (in linear scale).

In some example implementations, a single planar linear polarizer may be used for the optical/photonic device 202 in order to achieve similar effect in the privacy mode and the pass-through mode (by simply removing the second planar linear polarizer 304 and the third planar linear polarizer 306 and retain the rest of the optical/photonic scheme). In some other example implementations, two rather than 3 planar linear polarizers may be used in the optical/photonic device 202 in order to achieve similar effect in all of the privacy mode, pass-through mode, and the block mode. For example, the third planar linear polarizer 306 may be removed from the optical/photonic device 202 in FIGS. 3-5, and the second planar linear polarizer 304 in the block mode may be arranged such that its polarization axis is orthogonal to that of the first planar linear polarizer 302 with the same remaining optical/photonic configurations.

Figure 6:
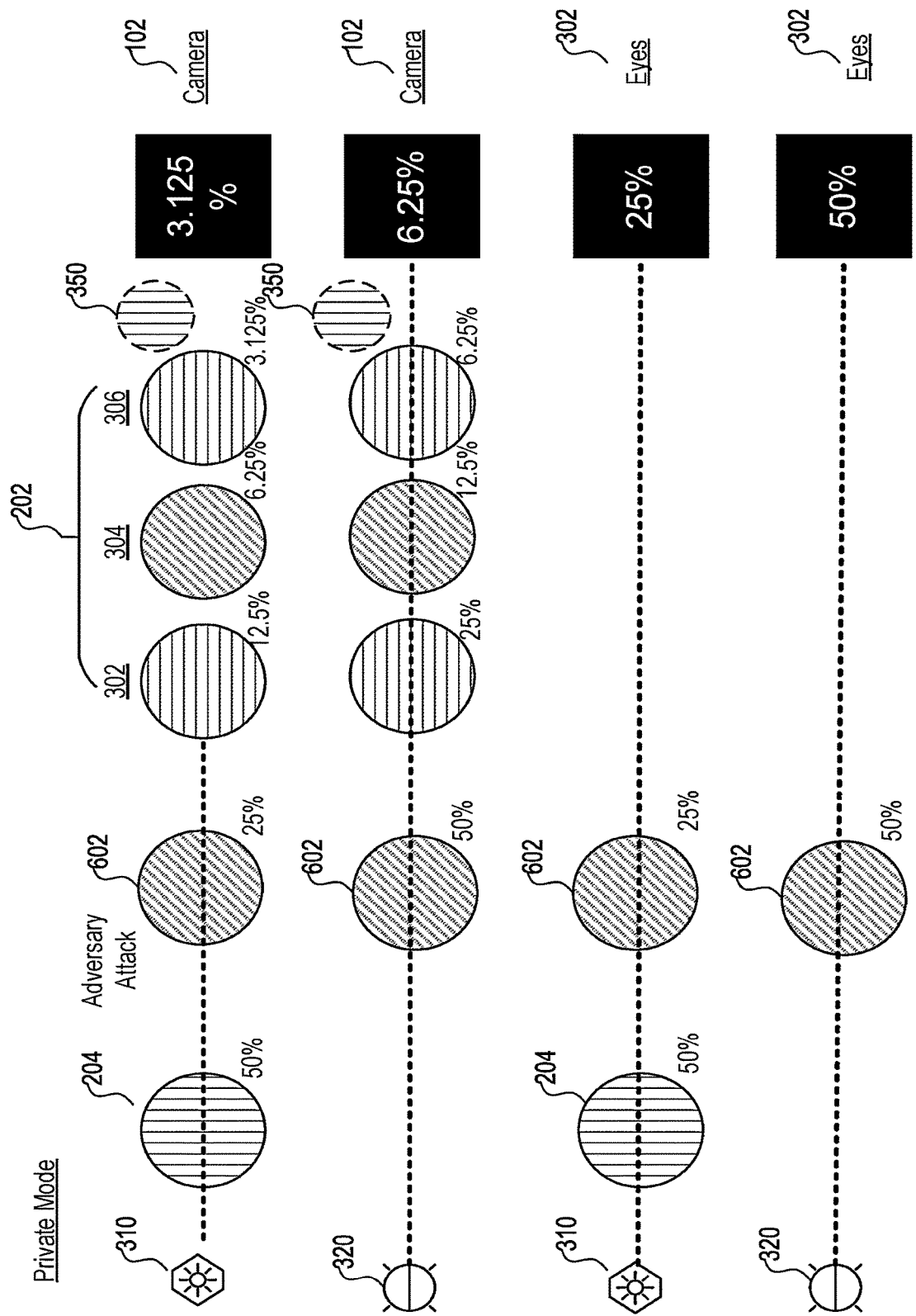
FIG. 6 illustrates a resilience of the example optical/photonic device and system of FIG. 3 in the privacy mode under an adversary attack.
Figure 7:
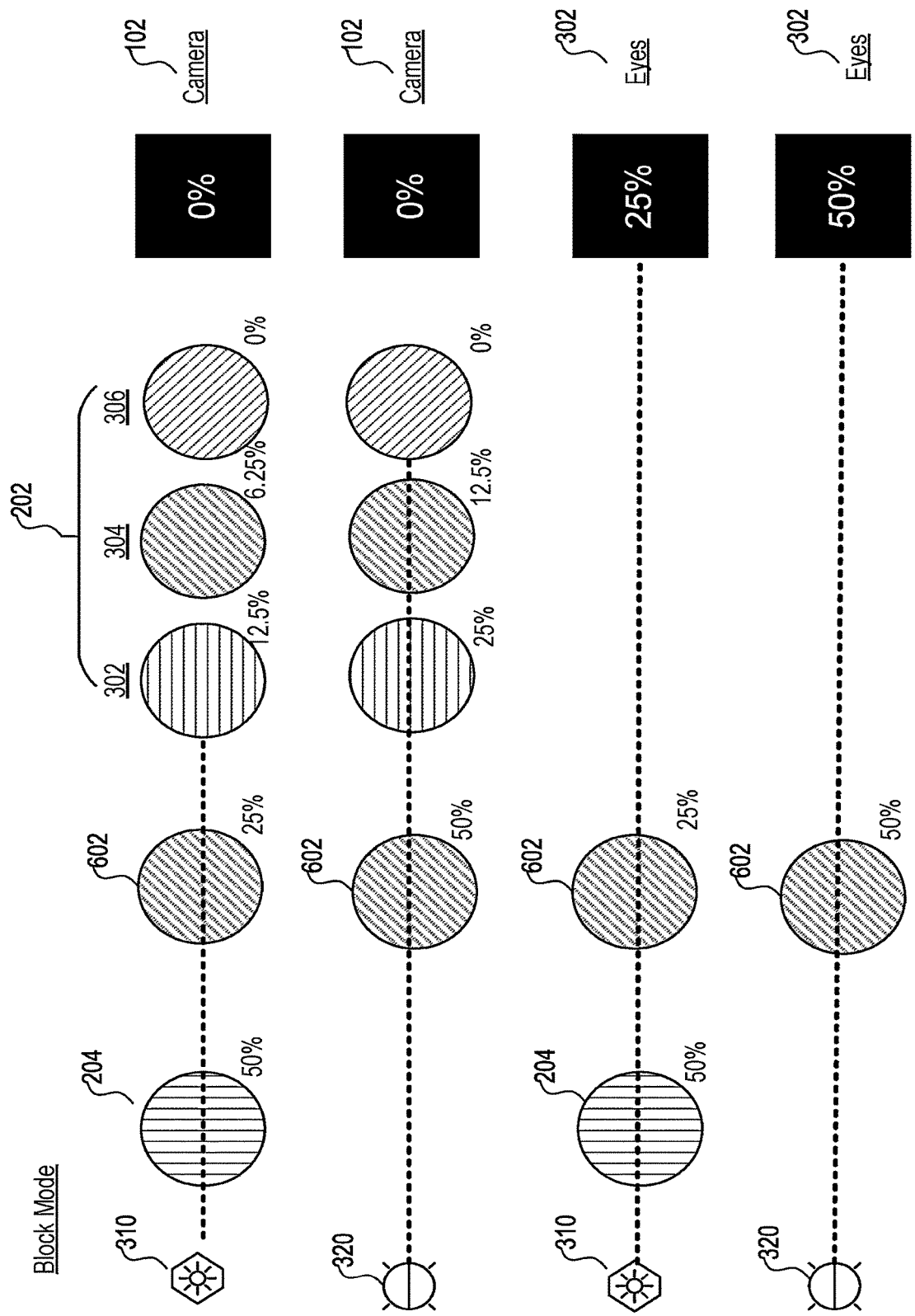
FIG. 7 illustrates a resilience of the example optical/photonic device and system of FIG. 5 in the block mode under an adversary attack.

However, the three-polarizer implementations for the optical/photonic device 202 shown in FIGS. 3-5 may be advantageous in providing improved resilience against adverse polarization attacks, as further shown in FIGS. 6-7.

As shown in FIGS. 6-7, an adverse attacker may find a way to mitigate with polarization of the private light 310 between optical/photonic component 204 and the optical/photonic device 202. Such polarization tempering may be represented by 602 in FIGS. 6 and 7.

As shown in the privacy mode of FIG. 6, for example, with the three-component design for the optical/photonic device 202, even if a polarization tampering device is in place and may convert the vertically polarized private light from the optical/photonic component 204 into, for example, a linear polarization that is 45 degrees off, the private light intensity reaching the camera sensor would still be only 3.125% of the original intensity, most likely being insufficient to provide adequate optical exposure for rendering useful imaging information of the privacy regions (light intensities after each of the optical/photonic component for the private light are shown in the top branch of FIG. 6). However, if the second planar linear polarizer 304 and the third planar linear polarizer 306 are not included in the optical/photonic device 202, the optical throughput of the private light in the presence of polarization tampering would be 12.5%, which may adversely provide sufficient exposure to generate image portions of the privacy regions that unauthorized hackers may get their hands on.

The second branch of FIG. 6 further shows that, in the presence of polarization tampering by 602, light from non-privacy regions (620) would be reduced to 6.25% of the original light intensity. The third branches of FIG. 6 shows that the privacy region would appear 4 times dimmer to a human observer whereas the non-privacy regions would appear 2 times dimmer.

As further shown in the block mode of FIG. 7 in the presence of polarization tampering by 602, no light would reach the camera sensor from either the privacy regions or the non-privacy regions because the second planar linear polarizer 304 and the third planar linear polarizer 306 are orthogonal and that it is assumed that no tampering can occur between these two optical/photonic components. Without the presence of the second planar linear polarizer 304 and the third planar linear polarizer 306, the throughput of the private light after the tampering by 602 would be 12.5% instead of full blocking.

The three-component implementations above for the optical/photonic device 202 are merely examples. Other numbers of polarizing components may be used in the optical/photonic device 202. In addition, other polarization configurations may also be implemented for the various modes including the privacy mode, the pass-through mode, and the block mode. A subset of the modes may be implemented. The polarization configuration of the various components of the optical/photonic device 202 may be designed to balance a reduction of throughput in the privacy mode under potential polarization tampering to a threshold level that does not render privacy image portions in the camera meaningfully exploitable by the adverse hackers while maintaining a meaningful recording of non-privacy regions of the environment such that the SLAM and other functionalities are not significantly compromised.

In some implementations, an optimization process may be implemented to determine the polarization configuration of the various optical/photonic components in the various modes above. The process may start with a given upper threshold throughput percentage levels for private light in the privacy mode and with potential polarization tampering. Such upper threshold may depend on an intensity range of the original private light. The optimization process may then search through the various polarization configuration to identify a configuration that provides a privacy mode throughput below the upper threshold while generating an maximum throughput (or an above-threshold throughput) for the non-private light for the non-privacy regions.

The optical/photonic device 202 in the various implementations above may be configured as a component that may be attached to cover the front optical aperture of the camera 102 via various coupling mechanisms, including but not limited to threading coupling and press contact coupling. The optical/photonic device 202 may be configured as a detachably coupled component or a permanently coupled components of the camera 102. One or more of the polarizer plates of the optical/photonic device 202 may be rotatably configured to the optical/photonic device 202 as an optical/photonic assembly. A such, these polarizer plates may be rotated to any desired orientation scheme for the various modes described above. In some example implementations, polarization axis may be marked along the peripheral parts of each of the planar polarizer plates. In some example implementations, guide marks may be further placed on the optical/photonic assembly of 202 and/or the camera body in order to assist in user rotation and alignment of the various polarization axes of the polarizer plates in order to place the optical/photonic device 202 into a desired operation mode among the various operational modes described above.

Figure 8:
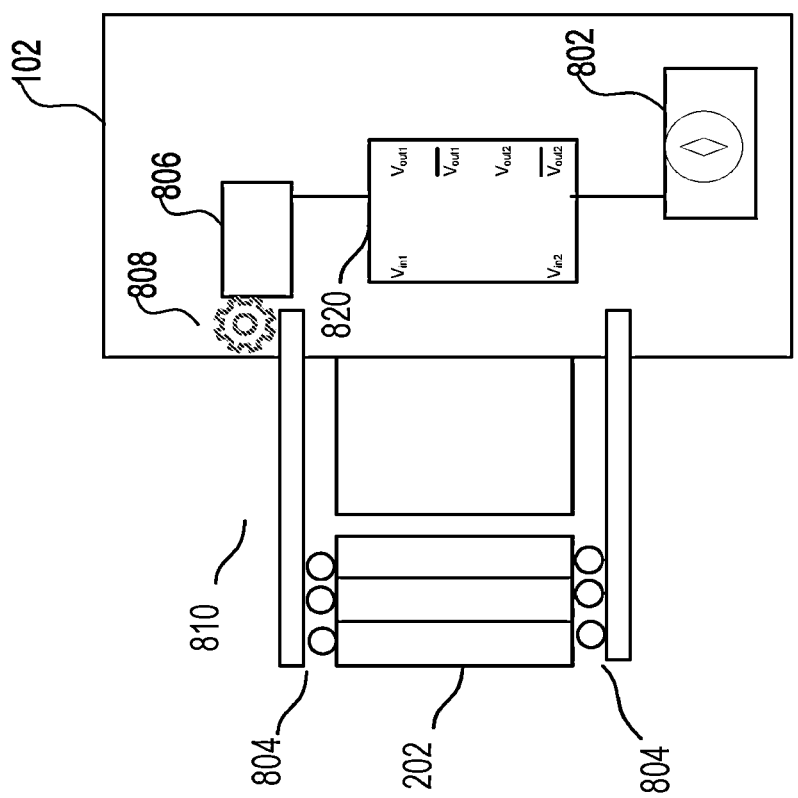
FIG. 8 illustrates an example polarization adjustment mechanism.

In some example implementations, rotation of one or more of the polarizer plates of the optical/photonic device 202, and/or the entire assembly of optical/photonic device 202 may be automatically controlled via a mechanical or electronic means. An example is shown in FIG. 8, where a rotary electric motor 806 may be used to drive gears 808 and 804 coupled to one or more of the polarizer plates of the optical/photonic device 202, and/or the entire assembly of optical/photonic device 202 (indicated as 810 in FIG. 8) to effectuate desired rotations. The electric motors 806 may be controlled by control/drive circuitry 820. The camera may further include an electronic user interface (not shown in FIG. 8) for the user to provide settings of the mode and other parameters, and for actuating the electric motor 806 to drive the various polarizer plates to designed angular positions for the various operation modes described above. In some example implementations, the optical/photonic configurations for the various modes may be designed such that only one of the three example polarizer plates of the optical/photonic device 202 needs to be manually or automatically rotated between the various operation modes. In some example implementations, the optical/photonic configurations for the various modes may be designed such that only two or fewer of the three example polarizer plates of the optical/photonic device 202 need to be manually or automatically rotated between the various operation modes.

In some further implementations, the camera may dynamically vary its orientation (e.g., in drone applications, or in augmented reality (AR) or virtual reality (VR) application with an AR or VR goggle-camera device may dynamically rotate in various directions when being worn). In those example applications, the polarization configurations of the various components above may also need to be dynamically adjusted in order to mainly optical orientation of the polarizer plates within the optical/photonic device 202 relative to the fixed predefined optical polarization of the optical/photonic component 204 with respect to the environmental reference frame. As such, as shown in FIG. 8, an additional orientation sensor 802 may be included as part of the optical/photonic device 202, or as part of the optical/photonic assembly 810, or as part of the camera 102. The orientation sensor 802 may be implemented as an accelerometer, a gyroscope, a magnetometer, and the like, and any combination thereof. Such an orientation sensor may be electrically coupled to the control/drive circuitry 820 for generating feedback control signals to effectuate a control of the polarization state of the optical/photonic device 202 via the electric motor 806 and the driving gears 808 and 904. As such, the operation mode may be dynamically maintained as the camera 102 or the optical/photonic device 202 change in orientation relative to the fixed environmental reference frame.

Electric actuation of the various polarization components as described above using rotary electric motors and gearsets constitutes merely an example implementation. Other types of rotational driving mechanisms can also be used, including but not limited to linear motors and other electro-mechanical actuators.

In some other example implementations, the polarization states of the at least one of the polarizer plates of the optical/photonic device 202 may be controlled electro-optically. For example, such a polarizer may be constructed using electrically controllable liquid crystal layer or other electro-optical materials. In those example implementations, the control of the polarization state of the one or more polarizer plates of the optical/photonic devices 202, either statically or dynamically, may be provided by applying appropriate electric signals (e.g., appropriate voltage levels) via electrodes coupled to the liquid crystal layer of the other electro-optical materials within the polarizer plates.

The disclosure above thus provides a novel and enhanced application of polarized light techniques with multiple optical polarization filters to enable partial or full privacy while not disabling SLAM and other algorithms used in video devices such as VR/AR and robot/drone cameras. This disclosed approach also dynamically account for orientation changes during operation of the camera devices, allowing no or a small amount of light from the privacy protected area into the cameras in a privacy mode. When the camera is not in use, the user can configure the polarizers in a block mode to reject 100% of all light and enable full privacy.

In one example implementation, an optical/photonic device is disclosed. The optical/photonic device may include a polarization assembly comprising a stack of multiple planar polarizer plates with an optical aperture; a mounting mechanism adapted for coupling the polarization assembly to a camera to cover an input aperture of the camera, the camera being operative in a predefined reference frame; and a polarization control mechanism for separate adjustment of at least two of the multiple planar polarizer plates between at least a privacy-protection mode and a normal mode of the polarization assembly. The polarization assembly, when being adjust to the privacy-protection mode, is configured to reject input light in a predefined polarization state with respect to the predefined reference frame from entering the optical aperture of the camera, and to allow for entry into the optical aperture of the camera at least an attenuated portion of the input light in an unpolarized state with respect to the predefined reference frame. The polarization assembly, when being adjusted to the normal mode, is configured to allow for entry into the optical aperture of the camera at least an attenuated portion of the input light having either the predefined polarization state or the unpolarized state with respect to the predefined reference frame.

In the example implementation above, the polarizer assembly may include a first, a second, and a third planar linear polarizer plate arranged in order of reverse proximity to the camera.

In any one of the example implementations above, and in the privacy-protection mode, a first polarization axis of the first planar linear polarizer plate may be configured to be orthogonal to the predefined polarization state with respect to the predefined reference frame.

In any one of the example implementations above, and in the normal mode, the first polarization axis may be configured to be aligned with the predefined polarization state with respect to the predefined reference frame.

In any one of the example implementations above, and in the privacy-protection mode, a second polarization axis of the second planar linear polarizer plate may be configured to form a first nonzero and non-normal angle with the first polarization axis, and a third polarization axis of the third planar linear polarizer plate may be configured to form a second nonzero and non-normal angle with the second polarization axis.

In any one of the example implementations above, the first nonzero and non-normal angle and the second nonzero and non-normal angle may be 45 degrees.

In any one of the example implementations above, and in the normal mode, the first polarization axis, the second polarization axis, and the third polarization axis may all be aligned with the predefined polarization state with respect to the predefined reference frame.

In any one of the example implementations above, the polarization control mechanism may be configured for separate adjustment of at least two of the multiple planar polarizer plates to a block mode in addition to the privacy-protection mode and the normal mode of the polarization assembly.

In any one of the example implementations above, and in the block mode, polarization axes of the second planar linear polarizer plate and the third planar linear polarizer plate may be configured to be orthogonal.

In any one of the example implementations above, and in the block mode, a polarization axis of the first planar linear polarizer plate may be configured to be orthogonal to the predefined polarization state.

In any one of the example implementations above, the polarization assembly may be configured to enable the camera to record an image of a scene divided into privacy regions and non-privacy region. The privacy regions may be configured to function as sources of light having the predefined polarization state.

In any one of the example implementations above, the privacy regions include a display screen or an outdoor-facing window area.

In any one of the example implementations above, each of the privacy regions of the scene may be adapted with a polarization component that converts each of the privacy regions into a source of light having the predefined polarization state.

In any one of the example implementations above, the polarization assembly may further include an electrical drive mechanism configured to dynamically rotate at least one of the multiple planar polarizer plates.

In any one of the example implementations above, the optical/photonic device may further include an orientation sensor configured to detect an orientation of the optical/photonic device with respect to the predefined reference frame; and a feedback circuitry configured to generate a signal for driving the at least one of the multiple planar polarizer plates via the electrical drive mechanism so as to dynamically maintain the polarization assembly in one of the privacy mode and the normal mode.

In any one of the example implementations above, the orientation sensor may include an accelerometer, a gyroscope, or a magnetometer.

In any one of the example implementations above, the orientation sensor may be disposed within the camera.

In any one of the example implementations above, the polarization control mechanism may include a mechanical rotational mechanism.

In any one of the example implementations above, polarization axis of at least one of the multiple planar polarizer plates may be electrically controllable and the polarization control mechanism is configured to generate an electric signal and apply the electric signal to the at least one of the multiple planar polarizer plates to adjust the polarization axis.

In some other example implementations, a method for selective privacy protection in imaging applications is disclosed. The method may include receiving measurements from at least one sensors of an imaging device, wherein the imaging device comprises a stack of multiple planar polarizer plates with an optical aperture and a mounting mechanism adapted for coupling stack of multiple planar polarizer plates to a camera of the imaging device to cover an input aperture of the camera, the camera being operative in a predefined reference frame; deriving an orientational information of the imaging device in the predefined reference frame based on the received measurements; and generating one or more control signals to dynamically adjust at least two of the multiple planar polarizer plates to maintain the imaging device in one of at least a privacy-protection mode and a normal mode. The stack of multiple planar polarizer plates, when being adjust to the privacy-protection mode, may be configured to reject input light in a predefined polarization state with respect to the predefined reference frame from entering the optical aperture of the camera, and to allow for entry into the optical aperture of the camera at least an attenuated portion of the input light in an unpolarized state with respect to the predefined reference frame. Furthermore, the stack of multiple planar polarizer plates, when being adjusted to the normal mode, may be configured to allow for entry into the optical aperture of the camera at least an attenuated portion of the input light having either the predefined polarization state or the unpolarized state with respect to the predefined reference frame. The control of at least two of the stack of multiple planar polarizer plates may be achieved via one or more motorized rotation or electro-optical control mechanisms.

In the example method implementations above, the polarizer assembly may include a first, a second, and a third planar linear polarizer plate arranged in order of reverse proximity to the camera.

In any one of the example method implementations above, in the privacy-protection mode, the one or more control signals may be generated to control a first polarization axis of the first planar linear polarizer plate to be orthogonal to the predefined polarization state with respect to the predefined reference frame.

In any one of the example method implementations above, and in the normal mode, the one or more control signals may be generated to control the first polarization axis to be aligned with the predefined polarization state with respect to the predefined reference frame.

In any one of the example method implementations above, and in the privacy-protection mode, the one or more control signals may be generated to control a second polarization axis of the second planar linear polarizer plate to form a first nonzero and non-normal angle with the first polarization axis, and control a third polarization axis of the third planar linear polarizer plate to form a second nonzero and non-normal angle with the second polarization axis.

In any one of the example method implementations above, the first nonzero and non-normal angle and the second nonzero and non-normal angle may be 45 degrees.

In any one of the example method implementations above, and in the normal mode, the one or more control signals may be configured to control the first polarization axis, the second polarization axis, and the third polarization axis to align with the predefined polarization state with respect to the predefined reference frame.

In any one of the example implementations above, the one or more control signals may be configured for separate adjustment of at least two of the stack of multiple planar polarizer plates to a block mode in addition to the privacy-protection mode and the normal mode of the stack of multiple planar polarizer plates.

In any one of the example method implementations above, and in the block mode, the one or more control signals may be configured to control polarization axes of the second planar linear polarizer plate and the third planar linear polarizer plate to be orthogonal.

In any one of the example implementations above, and in the block mode, the one or more control signals may be configured to control a polarization axis of the first planar linear polarizer plate to be orthogonal to the predefined polarization state.

In any one of the example method implementations above, the one or more control signals may be configured to control the stack of multiple planar polarizer plates to enable the camera to record an image of a scene divided into privacy regions and non-privacy region. The privacy regions may be configured to function as sources of light having the predefined polarization state.

In any one of the example method implementations above, the privacy regions may include a display screen or an outdoor-facing window area.

In any one of the example method implementations above, each of the privacy regions of the scene may be provided and adapted with a polarization component that converts each of the privacy regions into a source of light having the predefined polarization state.

In any one of the example method implementations above, the stack of multiple planar polarizer plates may further include an electrical drive mechanism configured to dynamically rotate at least one of the multiple planar polarizer plates, and the method may include applying the one or more control signals to drive the stack of multiple planar polarizer plates.

In any one of the example method implementations above, the orientation sensor may include an accelerometer, a gyroscope, or a magnetometer.

In any one of the example method implementations above, the orientation sensor may be disposed within the camera.

In any one of the example device and method implementations above, the camera may be included in a drone.

The example schemes above may be employed in various application scenarios including but not limited to:

AR/VR interactive application where an AR/VR goggles/camera is used in an application setting that the AR/VR needs to perform SLAM and/or other spatial tracking functions while private/sensitive/confidential areas in the application setting need to be protected.

Remote home design or site design via AR/VR assistance/consulting, where parts of the home or site need to be protected.

Robots (such as robotic vacuum machine) with cameras that track surroundings of environmental settings via SLAM or other techniques while private/sensitive/confidential areas in the environmental settings need to be protected.

A medical educational setting where a medical procedure is being performed and recorded for educational purposes, while parts of the scene of patient may need to be protected from being recorded. The protection polarization may be provided by "polarizing blanket" or a transmissive polarizing screen sitting between the protection region and the camera.

An engineering setting where videos are taken of prototypes where protected parts of the prototype may be protected by applying a polarization film.

Remote industrial diagnostic/consulting situation where images/videos of a work site are fed to remote locations for diagnostic purposes while parts of the work site may be protected by applying polarization film or by using polarization screens.

Many other modifications of the implementations above may be made to adapt a particular situation or material to the teachings without departing from the scope of the current disclosure. Therefore, it is intended that the present methods and systems not be limited to the particular embodiments disclosed, but that the disclosed methods and systems include all embodiments falling within the scope of the appended claims.

We claim:

1. An optical/photonic device, comprising:
a polarization assembly comprising a stack of multiple planar polarizer plates with an optical aperture; and
a mounting mechanism adapted for coupling the polarization assembly to a camera to cover an input aperture of the camera, the camera being operative in a predefined reference frame; and
a polarization control mechanism for separate adjustment of at least two of the multiple planar polarizer plates between at least a privacy-protection mode and a normal mode of the polarization assembly,
wherein the polarization assembly, when being adjust to the privacy-protection mode, is configured to reject input light in a predefined polarization state with respect to the predefined reference frame from entering the input aperture of the camera, and to allow for entry into the input aperture of the camera at least an attenuated portion of the input light in an unpolarized state with respect to the predefined reference frame; and
wherein the polarization assembly, when being adjusted to the normal mode, is configured to allow for entry into the input aperture of the camera at least an attenuated portion of the input light having either the predefined polarization state or the unpolarized state with respect to the predefined reference frame.

2. The optical/photonic device of claim 1, wherein the polarizer assembly comprises a first, a second, and a third planar linear polarizer plate arranged in order of reverse proximity to the camera.

3. The optical/photonic device of claim 2, wherein, in the privacy-protection mode, a first polarization axis of the first planar linear polarizer plate is configured to be orthogonal to the predefined polarization state with respect to the predefined reference frame.

4. The optical/photonic device of claim 3, wherein, in the normal mode, the first polarization axis is configured to be aligned with the predefined polarization state with respect to the predefined reference frame.

5. The optical/photonic device of claim 4, wherein, in the privacy-protection mode, a second polarization axis of the second planar linear polarizer plate is configured to form a first nonzero and non-normal angle with the first polarization axis, and a third polarization axis of the third planar linear polarizer plate is configured to form a second nonzero and non-normal angle with the second polarization axis.

6. The optical/photonic device of claim 5, wherein the first nonzero and non-normal angle and the second nonzero and non-normal angle are 45 degrees.

7. The optical/photonic device of claim 5, wherein, in the normal mode, the first polarization axis, the second polarization axis, and the third polarization axis are all aligned with the predefined polarization state with respect to the predefined reference frame.

8. The optical/photonic device of claim 2, wherein the polarization control mechanism is configured for separate adjustment of at least two of the multiple planar polarizer plates to a block mode in addition to the privacy-protection mode and the normal mode of the polarization assembly.

9. The optical/photonic device of claim 8, wherein, in the block mode, polarization axes of the second planar linear polarizer plate and the third planar linear polarizer plate are configured to be orthogonal.

10. The optical/photonic device of claim 9, wherein, in the block mode, a polarization axis of the first planar linear polarizer plate is configured to be orthogonal to the predefined polarization state.

11. The optical/photonic device of claim 2, wherein the polarization assembly is configured to enable the camera to record an image of a scene divided into privacy regions and non-privacy regions, wherein the privacy regions are configured to function as sources of light having the predefined polarization state.

12. The optical/photonic device of claim 11, wherein the privacy regions comprise a display screen.

13. The optical/photonic device of claim 11, wherein the privacy regions comprise an outdoor-facing window area.

14. The optical/photonic device of claim 11, wherein each of the privacy regions of the scene is adapted with a polarization component that converts each of the privacy regions into a source of light having the predefined polarization state.

15. The optical/photonic device of claim 1, wherein the polarization assembly further comprises an electrical drive mechanism configured to dynamically rotate at least one of the multiple planar polarizer plates or a mechanical rotational mechanism.

16. The optical/photonic device of claim 15, the optical/photonic device further comprises:
an orientation sensor configured to detect an orientation of the optical/photonic device with respect to the predefined reference frame; and
a feedback circuitry configured to generate a signal for driving the at least one of the multiple planar polarizer plates via the electrical drive mechanism so as to dynamically maintain the polarization assembly in one of the privacy mode and the normal mode.

17. The optical/photonic device of claim 16, wherein the orientation sensor comprises an accelerometer, a gyroscope, or a magnetometer.

18. The optical/photonic device of claim 17, wherein the orientation sensor is disposed within the camera.

19. The optical/photonic device of claim 1, wherein polarization axis of at least one of the multiple planar polarizer plates is electrically controllable and the polarization control mechanism is configured to generate an electric signal and apply the electric signal to the at least one of the multiple planar polarizer plates to adjust the polarization axis.

20. A method for selective privacy protection in imaging applications, comprising:
  receiving measurements from at least one sensor of an imaging device, wherein the imaging device comprises a stack of multiple planar polarizer plates with an optical aperture and a mounting mechanism adapted for coupling the stack of multiple planar polarizer plates to a camera of the imaging device to cover an input aperture of the camera, the camera being operative in a predefined reference frame;
  deriving an orientational information of the imaging device in the predefined reference frame based on the received measurements; and
  generating one or more control signals to dynamically adjust at least two of the multiple planar polarizer plates to maintain the imaging device in one of at least a privacy-protection mode and a normal mode, wherein the stack of multiple planar polarizer plates:
    when being adjust to the privacy-protection mode, are controlled to reject input light in a predefined polarization state with respect to the predefined reference frame from entering the input aperture of the camera, and to allow for entry into the input aperture of the camera at least an attenuated portion of the input light in an unpolarized state with respect to the predefined reference frame; and
    when being adjusted to the normal mode, are controlled to allow for entry into the input aperture of the camera at least an attenuated portion of the input light having either the predefined polarization state or the unpolarized state with respect to the predefined reference frame.

* * * * *